United States Patent [19]

Toganoh et al.

[11] Patent Number: 4,642,654

[45] Date of Patent: Feb. 10, 1987

[54] RECORDING METHOD

[75] Inventors: Shigeo Toganoh; Ryuichi Arai, both of Tokyo, Japan

[73] Assignee: Canon Kabushiki Kaisha, Tokyo, Japan

[21] Appl. No.: 848,832

[22] Filed: Apr. 2, 1986

Related U.S. Application Data

[63] Continuation of Ser. No. 674,601, Nov. 26, 1984, abandoned.

[51] Int. Cl.[4] .......................... G01D 15/16; B32B 5/16

[52] U.S. Cl. .................................. 346/1.1; 346/135.1; 346/140 R; 346/75; 428/206; 428/304.4; 428/316.6; 428/326; 428/327; 428/331

[58] Field of Search ................. 346/135.1, 1.1, 140 R, 346/75; 428/206, 304.4, 316.6, 326, 327, 331

[56] References Cited

U.S. PATENT DOCUMENTS 4,460,637 7/1984 Miyamoto et al. ............ 428/212 X 4,474,847 10/1984 Schröder et al. .............. 428/323 X

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

A recording method comprises forming liquid droplets of a recording liquid, or liquid droplets of each of yellow, cyan, magenta and black recording liquids and attaching the droplets to a recording member. The receiving member is constituted of a support and a receiving layer overlying the support and containing filler particles and there is a relationship, $0.03 \leqq d/D \leqq 0.3$ where d is the particle size of the filler and D is the diameter of the liquid droplets.

8 Claims, 1 Drawing Figure

RECORDING METHOD

This application is a continuation of application Ser. No. 674,601, filed Nov. 26, 1984, now abandoned.

BACKGROUND OF THE INVENTION

1. Field of the Invention

This invention relates to a recording method using a recording liquid (hereinafter referred to as "ink"), and more particularly, to a multi-color recording method.

2. Description of the Prior Art

Ink jet recording is effected by generating and flying small droplets of an ink by various ink ejecting methods (e.g. electrostatic suction, application of mechanical vibration or displacement to ink using a piezoelectric element, or utilizing a pressure of bubbles formed by heating the liquid) and attaching a part or all of the small droplets to a receiving member such as paper and the like. Such a recording method gets much attention since the noise is little and high speed printing and multi-color printing are possible.

As an ink for ink jet recording, there is used mainly an aqueous ink from the standpoint of safety and printing suitability, and as a receiving member, there has been generally used, heretofore, plain paper. When recording is effected with a liquid ink, it is required in general that the ink does not blot and the printed letter is not blurred, and in addition, it is desired that the ink is dried as soon as possible after recording and does not stain the paper surface.

In particular, in the case of a multi-color ink jet recording where two or more inks of different colors are used, the following conditions should be satisfied:

(1) Even when an ink is rapidly absorbed to a receiving member and an ink dot overlaps another ink dot of a different color, the ink attached later neither mixes with the previously attached ink nor disturbs the ink dot, and does not flow out;

(2) an ink drop does not diffuse on the receiving member and the ink dot diameter does not become unnecessarily large;

(3) the shape of the ink dot is almost a true circle and the circumference of the dot is smooth;

(4) the density of each ink dot is high and the circumference of the dots is not blurred;

(5) the color of a receiving member is white and the contrast between the ink dot and the receiving member is large;

(6) the color of ink is not changed by the receiving member;

(7) the dimension of a receiving member does not change (e.g. wrinkle or elongation) before and after the recording; and the like.

Though it is understood that characteristics of the receiving member will play an important role to satisfy the above-mentioned requirements, conventional receiving members such as sized plain paper and coated paper can not meet the above-mentioned requirements.

In the case of the sized plain paper, diffusion of ink in the direction of the paper surface, a socalled blotting, can be suppressed, but ink can not be easily absorbed. As a result, there are the following drawbacks. The time required for fixing ink droplets is greater and, moreover, when ink droplets overlap, ink droplets of different colors are mixed or undesired enlarging of ink dots occurs or irregular ink dots are formed.

In view of the above-mentioned drawbacks, coated paper having a coating of a hydrophilic resin on the surface of the substrate paper has been proposed. However, the dye in the ink penetrates into the coated paper to a great extent and therefore, the diameter of the dot is liable to become large and the circumference of the dot is liable to blur.

Further, the shape and dimension of the paper change to a great extent depending upon the degree of hygroscopic property. In addition, the coating sometimes disadvantageously exfoliates from the substrate paper resulting in degradation of the recording quality, and further, it is a very difficult technique to form on the surface of a substrate paper a coating layer of uniform characteristics.

SUMMARY OF THE INVENTION

An object of the present invention is to provide a recording method solving the abovementioned problems of the prior art.

Another object of the present invention is to provide a recording method satisfying the abovementioned desired conditions where a full color image recording is effected with a plurality of color inks according to an ink jet recording method.

According to the present invention, there is provided a recording method comprising forming liquid droplets of a recording liquid or liquid droplets of each of yellow, cyan, magenta and black recording liquids and attaching the droplets to a receiving member, characterized in that the receiving member comprises of a support and a receiving layer overlying the support and containing filler particles and there is a relationship, $0.03 \leqq d/D \leqq 0.3$ where d is the particle size of the filler and D is the diameter of the liquid droplets.

DESCRIPTION OF THE PREFERRED EMBODIMENT

Figure 1:
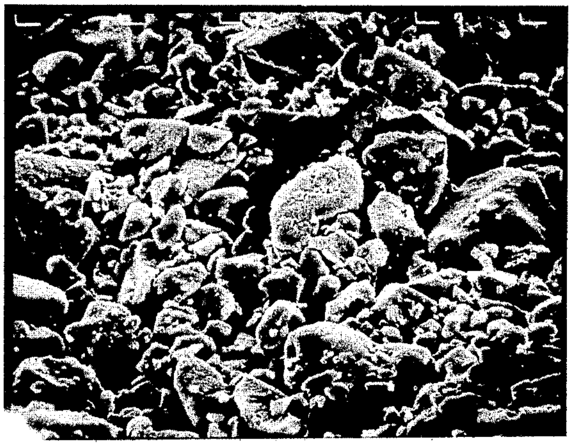
FIG. 1 is a scanning type electron microscopic photograph (magnification of about 1000 times) of the surface of the receiving layer of the receiving member used for the method of the present invention.

The receiving member used in the present invention is constituted of a support and a receiving layer overlying the support.

As the support of the receiving member, paper is preferably used, and there may be used porous materials such as cloth, porous resin, wood and the like, and also non-porous materials such as resin, metal, glass and the like.

Which to be used depends on the purpose of recording and the use.

On the other hand, the receiving layer comprises filler particles, and is usually composed of filler particles and a binder.

As the filler particles, there are used, for example, white inorganic pigments such as silica, talc, diatomaceous earth, calcium carbonate, calcium sulfate, barium sulfate, titanium oxide, zinc oxide, satin white, aluminum silicate, lithopone, alumina, zeolite and the like, and organic high polymer particles such as polystyrene, polyethylene, urea-formaldehyde resins, polyvinyl chloride, poly(methyl methacrylate) and the like.

It is necessary to select appropriate filler particles depending on the diameter of liquid droplet of a recording liquid. The larger the diameter of the liquid droplet, the more the amount of the recording liquid attaching to the receiving member, and therefore, it is desirable to use a receiving member of a large ink absorbing capacity, and if the ink absorbing capacity is not sufficient, the attached ink flows away. The ink absorbing capacity of a receiving member can be controlled by selecting an appropriate particle size of the filler added to the receiving layer, and in general, the larger the particle size of the filler, the larger the ink absorbing capacity. However, when the particle size of the filler is remarkably larger than the diameter of the liquid droplet of the recording liquid, the shape of the printed dot becomes less circular and the surface of the receiving member is less smooth.

The diameter of liquid droplets of a recording liquid in ink jet recording methods is usually 20–1000 μm. According to the present invention, it has been found that when the particle size d of the filler and the diameter of the liquid droplet D satisfies the relation, $0.03 \leqq d/D \leqq 0.3$, the ink absorbing capacity is good and circularity of the printed dot is not lowered. When d/D is less than 0.03, the amount of the binder for the filler should be remarkably decreased so as to obtain a necessary ink absorbing capacity. When the amount of the binder is decreased as above, the receiving layer is liable to exfoliate and therefore, the receiving member is not practically usable. On the contrary, when d/D exceeds 0.3, circularity of the printed dot is lowered and good images can not be produced.

Filler particles of a high colorant absorbing property are preferable and further, those having porous structure are preferable since capturing the colorant in the ink at the most surface layer of the ink absorbing layer results in good coloring.

Representative binders are water soluble high polymers such as starch, gelatin, casein, gum arabic, sodium alginate, carboxymethylcellulose, polyvinyl alcohol, polyvinyl pyrrolidone, sodium polyacrylate, polyacrylamide and the like, and organic solvent soluble resins such as synthetic resin latexes, e.g. synthetic rubber latex, polyvinyl butyral, polyvinyl chloride, polyvinyl acetate, polyacrylonitrile, polymethyl methacrylate, polyvinyl formal, melamine resins, polyamide resins, phenolic resins, polyurethane resins, alkyd resins and the like. These binders may be used alone or in combination.

The receiving layer may contain dispersants, fluorescent dyes, pH controllers, defoaming agents, lubricants, antiseptic, surfactants or other additives.

The receiving member suitable for the present invention may be produced by applying to a support a coating liquid produced by dispersing the abovementioned various components for the receiving layer in a medium such as water according to a roll-coating method, rod bar coating method, spray coating method, air-knife coating method or the like, followed by drying as rapidly as possible. The weight ratio of the filler particles to the binder in the coating liquid is, in general, preferably 100 parts by weight of the filler particles to 10–100 parts by weight of the binder. When the average particle size of the filler particles is large, it is desired that the amount of the binder is as little as possible since a good result is obtained. The amount of the receiving layer on a support is usually about 1–50 $g/m^2$ (dry base), preferably about 2–30 $g/m^2$ (dry base).

FIG. 1 is a scanning type electron microscopic photograph (magnification of about 1000 times) of the surface of the recording layer of the receiving member thus prepared suitable for the method of the present invention. FIG. 1 clearly shows a unique surface state. That is, filler particles which are a main component of the receiving layer and have a relatively large particle size and an irregular shape appear on the surface of the receiving layer in such a manner that the particles are disposed at random. Among the particles there are scattered many big gaps functioning as ink absorbing holes, and the surface structure is in a sense such that various, large or small rubbles are scattered. Naturally, these filler particles appearing on the surface are fixed to the receiving layer with a binder and are not easily released from the receiving layer.

When ink jet recording is effected by using a receiving member having a receiving layer containing filler particles overlying a support, the relation between the particle size of the filler and the diameter of the liquid droplet satisfies a particular condition as mentioned above according to the present invention.

According to the present invention, even when inks of different color overlap and attach to the same portion within a short time, there are not caused any undesired mixing of colors, flowing-out of ink and blotting of ink, and there are produced clear images of high resolution. Moreover, color formation characteristics are good, and in particular, the method of the present invention is suitable for full color recording.

The method of the present invention will be explained in detail below.

EXAMPLES 1-15, COMPARATIVE EXAMPLE 1

Based on the following composition, 8 types of a composition for a coat were formed by varying variously the filler particles (Details of the used filler materials are shown in Table 1).

| | |
|---|---|
| Filler particles | 100 parts by weight |
| Poly(vinyl alcohol) | 25 parts by weight |
| SBR latex | 5 parts by weight |
| Water | 500 parts by weight |

Alternatively, a general high quality paper of 65 $g/m^2$ was used as a support, each of the 8 types of the composition for the coat was coated on the support by a blade coater method at a dry coating weight of 20 $g/m^2$, and then dried by a conventional method to produce a receiving member.

A scanning type electron microscopic photograph (magnification of about 1000 times) of the surface of the receiving member used in Examples 7–8 was as shown in Table 1.

Using the receiving member, an ink jet recording was carried out by variously varying the diameter of droplets of ink.

As the ink, 4 types of the ink of the following composition were used.

| | |
|---|---|
| Yellow ink (composition) | |
| Water | 70 parts by weight |
| Diethylene glycol | 30 parts by weight |
| C.I. acid yellow 23 | 2 parts by weight |
| Magenta ink (composition) | |
| Water | 70 parts by weight |
| Diethylene glycol | 30 parts by weight |
| C.I. acid red 92 | 2 parts by weight |
| Cyan ink (composition) | |
| Water | 70 parts by weight |
| Diethylene glycol | 30 parts by weight |

-continued

| | |
|---|---|
| C.I. direct blue 86 | 2 parts by weight |
| Black ink (composition) | |
| Water | 70 parts by weight |
| Diethylene glycol | 30 parts by weight |
| C.I. direct black 154 | 2 parts by weight |

In each Example and Comparative example, the record was evaluated by the following methods.

(Dot density)

Dot of black ink was measured by a microdensitometer manufactured by KONISHIROKU PHOTO IND. CO., LTD.)

(Dot shape)

Printed dots were observed through a stereomicroscope, and the following evaluation was given.

O . . . substantially circle
Δ . . . little deformed circle
X . . . irregular shape.

(Degree of Blur)

Diameter of the printed dot was determined by using a stereomicroscope. The degree of blur was shown as a ratio of the diameter of the printed dot to that of the ink droplet.

(Property of Color)

Sharpness of color of an image recorded by using a cyan, magenta, yellow and black ink, was observed through the naked eye, and the following evaluation was given.

O . . . very bright
X . . . not bright
Δ . . . between the above two.

(Absorption Property of Ink)

Cyan, magenta and yellow inks were jetted such that they were overlapped, and after 1 second, the resulting ink image was rubbed with a finger.

O . . . A finger is not stained with ink.
X . . . A finger is stained with ink.

The evaluation results are shown in Table 1.

TABLE 1

| Example No. | Filler particle | Diameter of particle | Diameter of liquid droplet | Dot density | Dot shape | Degree of blur | Property of color | Absorption property of ink |
|---|---|---|---|---|---|---|---|---|
| Example 1 | silica | 1 μm | 30 μm | 0.76 | O | 2.4 | O | O |
| Comparative Example 1 | " | 1 μm | 60 | 0.78 | O | 2.4 | X | X |
| Comparative Example 2 | " | 1 μm | 90 | 0.78 | O | 2.4 | X | X |
| Example 2 | " | 2.5 μm | 30 | 0.77 | O | 2.5 | O | O |
| Example 3 | " | 2.5 μm | 60 | 0.78 | O | 2.5 | O | O |
| Comparative Example 3 | " | 2.5 μm | 90 | 0.79 | O | 2.5 | Δ | X |
| Example 4 | " | 5 μm | 30 | 0.77 | O | 2.6 | O | O |
| Example 5 | " | 5 μm | 60 | 0.78 | O | 2.6 | O | O |
| Example 6 | " | 5 μm | 90 | 0.78 | O | 2.6 | O | O |
| Comparative Example 4 | " | 10 μm | 30 | 0.80 | X | 2.7 | Δ | O |
| Example 7 | " | 10 μm | 60 | 0.80 | O | 2.7 | O | O |
| Example 8 | " | 10 μm | 90 | 0.81 | O | 2.7 | O | O |
| Comparative Example 5 | " | 20 μm | 30 | 0.78 | X | 2.6 | X | O |
| Example 9 | " | 20 μm | 60 | 0.80 | Δ | 2.6 | O | O |
| Example 10 | " | 20 μm | 90 | 0.81 | O | 2.6 | O | O |
| Example 11 | calcium carbonate | 2 μm | 30 | 0.72 | O | 2.6 | O | O |
| Example 12 | calcium carbonate | 2 μm | 60 | 0.72 | O | 2.6 | O | O |
| Comparative Example 6 | calcium carbonate | 2 μm | 90 | 0.73 | O | 2.6 | X | X |
| Comparative Example 7 | kaolin | 0.8 μm | 30 | 0.66 | O | 2.8 | X | X |
| Comparative Example 8 | " | 0.8 μm | 60 | 0.68 | O | 2.8 | X | X |
| Comparative Example 9 | " | 0.8 μm | 90 | 0.68 | O | 2.8 | X | X |
| Example 13 | talc | 7.3 μm | 30 | 0.71 | O | 2.4 | Δ | O |
| Example 14 | " | 7.3 μm | 60 | 0.70 | O | 2.4 | Δ | O |
| Example 15 | " | 7.3 μm | 90 | 0.71 | O | 2.4 | Δ | O |

What we claim is:

1. A color recording method comprising the steps of forming liquid droplets of at least two colors of recording liquids and transferring the different color droplets to a receiving member, said receiving member having a support and a receiving layer overlying the support and containing filler particles, wherein the ratio d/D, where d represents the size of the filler particles and D represents the size of the liquid droplets, is in a range of about 0.03 to 0.3.

2. A recording method according to claim 1, in which D is 20–1000 μm.

3. A recording method according to claim 1, in which the filler particles have a porous structure.

4. A recording method according to claim 1, in which the receiving layer further contains a binder.

5. An ink jet recording method comprising the steps of forming liquid droplets of at least two colors of recording liquids selected from yellow, cyan, magenta and black recording liquids and transferring the different color droplets to a receiving member having support and a receiving layer overlying the support and containing filler particles, wherein the ratio d/D, where d represents the size of the filler particles and D represents the size of the liquid droplets, is in a range of about 0.03 to 0.3.

6. A recording method according to claim 5, in which D is 20–1000 μm.

7. A recording method according to claim 5, in which the filler particles have a porous structure.

8. A recording method according to claim 5, in which the receiving layer further contains a binder.

* * * * *